United States Patent [19]
Ishida

[11] Patent Number: 5,253,936
[45] Date of Patent: Oct. 19, 1993

[54] DATA COMMUNICATION APPARATUS AND DATA COMMUNICATION METHOD

[75] Inventor: Shinichi Ishida, Yokohama, Japan

[73] Assignee: Canon Kabushiki Kaisha, Tokyo, Japan

[21] Appl. No.: 960,278

[22] Filed: Oct. 13, 1992

Related U.S. Application Data

[63] Continuation of Ser. No. 611,641, Nov. 13, 1990.

[30] Foreign Application Priority Data

Nov. 16, 1989 [JP] Japan .................................. 1-296202

[51] Int. Cl.⁵ .................................................. H04N 1/40
[52] U.S. Cl. ...................... 358/427; 358/456
[58] Field of Search .............................. 358/429–430, 358/456–460, 466; 382/54, 56

[56] References Cited

U.S. PATENT DOCUMENTS

| | | |
|---|---|---|
| 4,688,100 | 8/1987 | Haganuma et al. ................. 358/261 |
| 4,701,806 | 10/1987 | Takashima .......................... 358/457 |
| 4,766,499 | 8/1988 | Inuzuka .............................. 358/457 |
| 4,827,353 | 5/1989 | Ehlers et al. ....................... 358/458 |
| 4,894,727 | 1/1990 | Sasaki ................................ 358/443 |
| 4,975,786 | 12/1990 | Katayama et al. ................. 358/459 |

Primary Examiner—Stephen Brinich
Attorney, Agent, or Firm—Fitzpatrick, Cella, Harper & Scinto

[57] ABSTRACT

According to this invention, an image binarized by a pseudo halftone binarization processing method is forcibly encoded by an MH encoding method, and a binary image which is not binarized by the pseudo halftone binarization processing method is preferentially encoded by an MR encoding method, so that a high compression ratio can be realized. When this method is applied to a facsimile apparatus, a communication time and a communication charge can be saved.

22 Claims, 4 Drawing Sheets

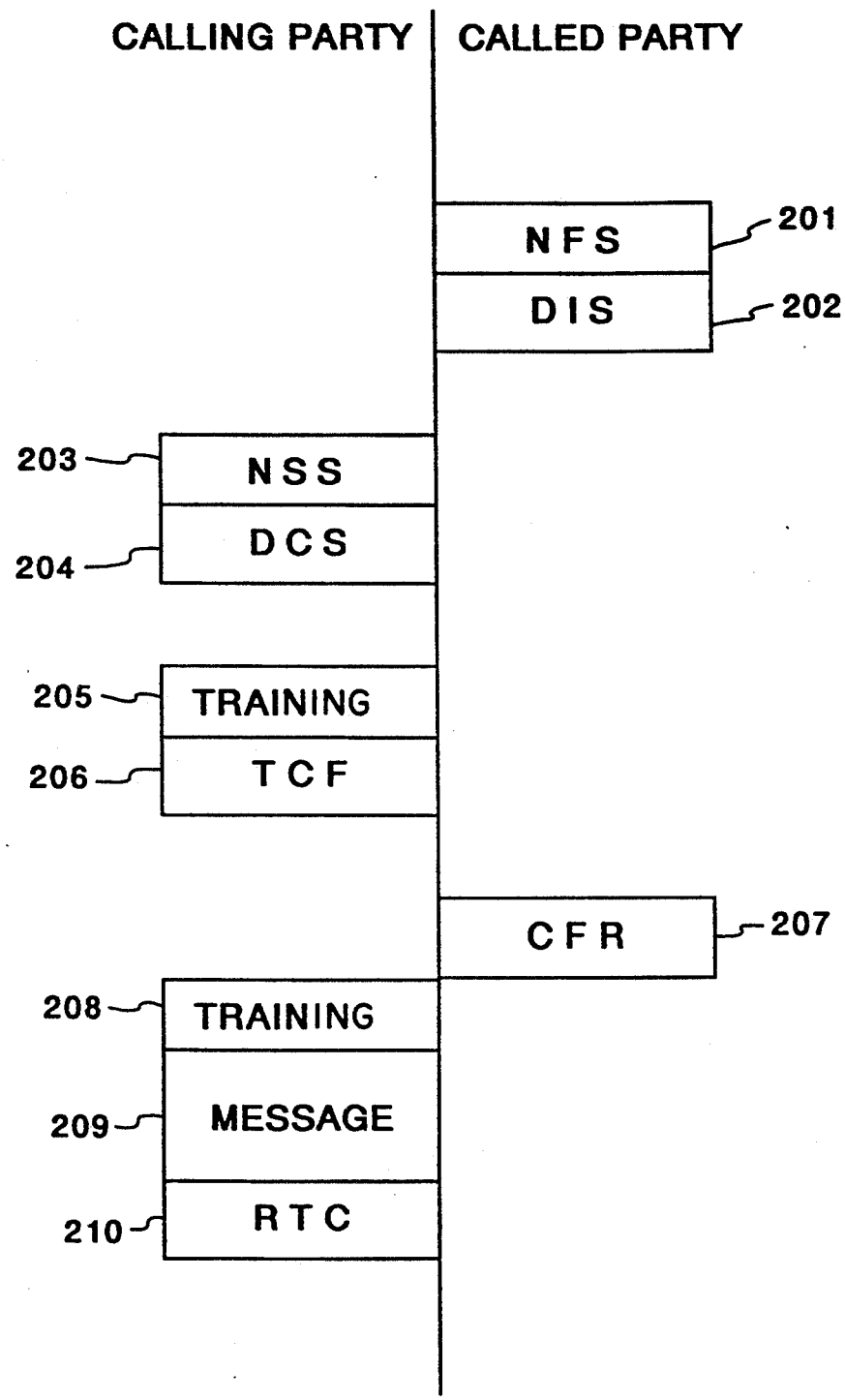
F I G. 2

DATA COMMUNICATION APPARATUS AND DATA COMMUNICATION METHOD

This application is a continuation of application Ser. No. 07/611,641 filed Nov. 13, 1990, now abandoned.

BACKGROUND OF THE INVENTION

The present invention relates to a data communication apparatus and a data communication method for transmitting/receiving a binary image.

In a conventional facsimile apparatus, when data transmission/reception is to be performed, a transmission side first scans an original using a photoelectric transducer such as a CCD, compresses an output signal from the photoelectric transducer into black-and-white binary data by binarization processing, and then sends the binary data to a reception side.

As the binarization processing, an operator selects an optimal binarization processing method upon operation of an external key in accordance with a type of original (e.g., a character original, a photograph original, a character-photograph mixed original, or the like).

For example, for a character original, binarization processing is attained by fixed threshold value processing, and for a photograph original or a photograph-character mixed original, binarization processing is attained by an error diffusion method or a dither method.

Binary data is encoded by a known MR (Modified Read) method, or an MH (Modified Huffman) method, and the encoded data is transmitted to a communication apparatus of a called party.

Upon selection of an encoding method such as the MR or MH method, in, for example, a G3 standard facsimile apparatus, a calling parity detects an encoding method of a called party on the basis of a DIS signal from the called party, and then determines a most efficient encoding method for both the calling and called parties from communication possible encoding methods, i.e., preferentially selects the MR method in the above-mentioned case as an encoding method.

Table 1 summarizes the relationship upon selection of encoding methods.

The relationship shown in Table 1 is established since a compression ratio of encoding by the MR method is higher than that by the MH method when general document information is subjected to communications.

As shown in Table 1, conventionally, of encoding and decoding methods of transmission and reception sides, a method which can minimize an information volume upon communication of general document information is selected, and the MR encoding method is preferentially selected.

However, image data which is binarized by a pseudo halftone processing method (a density preservation type binarization processing method such as an error diffusion method, a dither processing method, or the like) which is used to binarize a photograph original, of the binarization processing methods is preferably encoded by the MH encoding method rather than the MR encoding method to perform encoding with a higher compression ratio.

Therefore, in a conventional encoding method in which the MR encoding method is most preferentially selected, data is encoded by the MR encoding method which may impair a compression ratio to perform data transmission despite that a higher compression ratio may be attained by the MH encoding method depending on a binarization processing method.

This leads to an increase in communication time and communication charge.

SUMMARY OF THE INVENTION

The present invention has been made to eliminate the conventional drawbacks, and has as its object to provide a data communication apparatus and a data communication method, which can select a most efficient encoding method corresponding to actual communication data, and can perform binarization processing by an encoding method with a highest data communication efficiency.

As a means for achieving the above object, an embodiment comprises the following arrangement.

That is, an embodiment of the present invention comprises first image processing means for binarizing an original by a pseudo halftone processing method, second image processing means for binarizing an original with a fixed threshold value, selection means for selecting one of the first and second image processing means, encoding means for encoding a binary image by one of MH and MR encoding methods, and detection means for detecting which image processing means is selected by the selection means.

In the above-mentioned arrangement, a means for detecting whether a pseudo halftone binarization processing method or a fixed threshold value binarization processing method is selected is arranged. When the pseudo halftone binarization processing method is selected, the MH encoding method is adopted. In this manner, the most efficient encoding method corresponding to actual communication data can be selected, thus improving data communication efficiency.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a chart showing a protocol of a conventional G3 standard facsimile communication;

DETAILED DESCRIPTION OF THE INVENTION

Embodiment

An embodiment of the present invention will be described in detail below with reference to the accompanying drawings.

In the following description, a facsimile apparatus will be exemplified as an embodiment.

Figure 1:
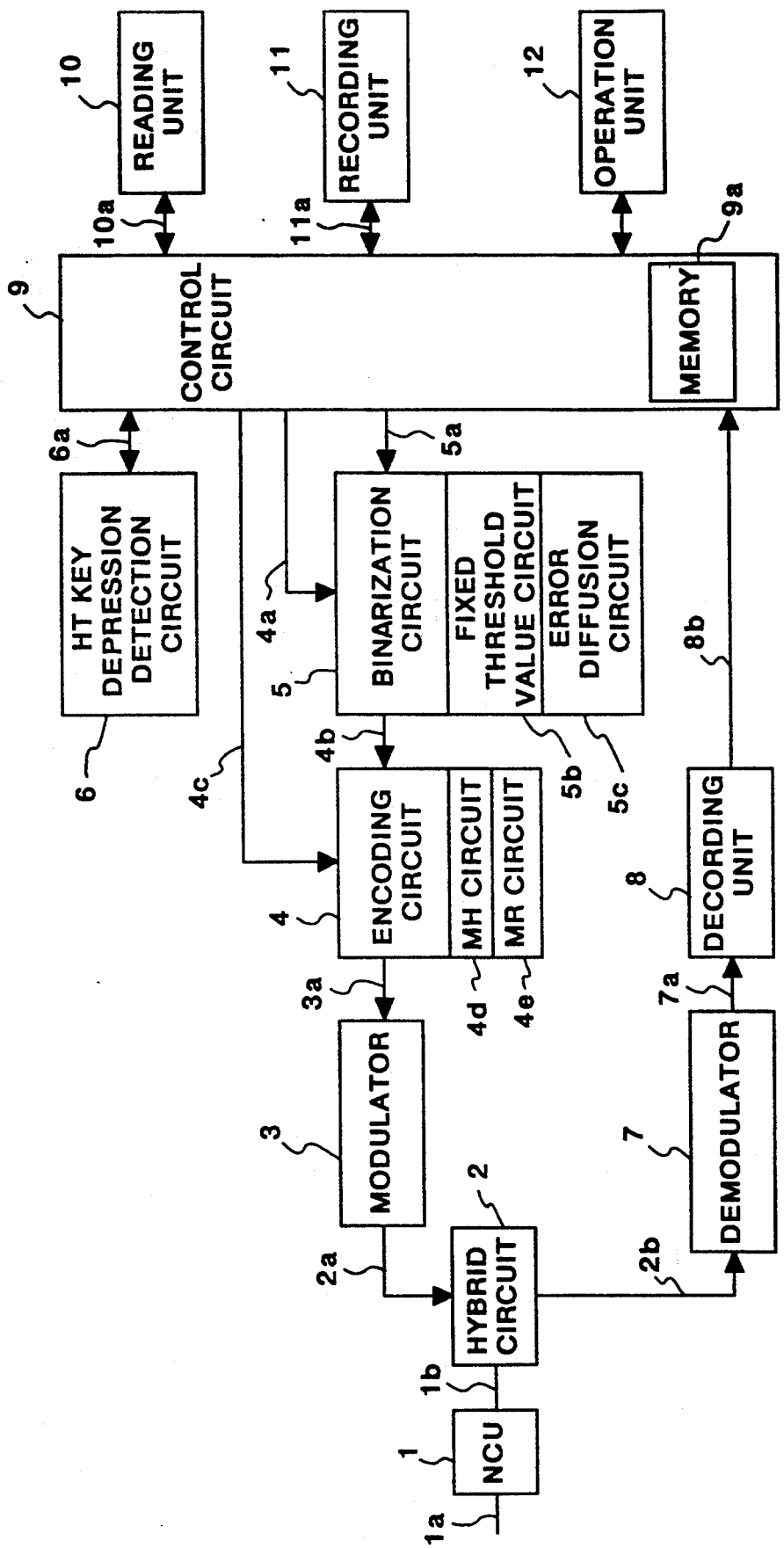
FIG. 1 is a block diagram of a facsimile apparatus according to an embodiment of the present invention.

FIG. 1 is a block diagram of a facsimile apparatus according to an embodiment of the present invention.

In FIG. 1, a network control unit (to be referred to as an NCU hereinafter) 1 performs connection control and controls interfaces between a channel and a telephone exchange network to use a public telephone network, to which the apparatus of this embodiment is connected, for, e.g., data communications. At the same time, the NCU 1 performs switching control to a data communication path, holds a linear loop with a channel, and so on.

Note that a signal line 1a is a telephone channel.

A hybrid circuit 2 is a circuit for separating transmission-system signals and reception-system signals. A transmission signal on a signal line 2a is output onto a signal line 1b via the hybrid circuit 2, and is then sent onto the telephone channel 1a via the NCU 1. A signal sent from a facsimile apparatus on the other end of a line through a telephone channel network is sent to the hybrid circuit 2 via the NCU 1 and the signal line 1b, and is separated by the hybrid circuit 2. The separated signal is sent onto a signal line 2b, and is then input to a demodulator 7.

A modulator 3 receives an encoded signal on a signal line 3a, and performs modulation based on a known CCITT recommendation V27ter (differential phase modulation) or V29 (orthogonal modulation). Data modulated by the modulator 3 is output to the hybrid circuit 2 through the signal line 2a. The data is then output to the connected channel 1a through the signal line 1b and the NCU 1, and is then sent to a connected apparatus through the telephone channel network.

An encoding circuit 4 receives binary data output onto a signal line 4b, and outputs, onto the signal line 3a, data encoded by an MH circuit 4d for encoding data by an MH (Modified Huffman) encoding method or by an MR circuit 4e for encoding data by an MR (Modified Read) encoding method.

Of these circuits, the MH circuit 4d is selected when "1" is output from a control circuit 9 onto a signal line 4c; the MR circuit 4e is selected when "0" is output onto the signal line 4c.

A binarization circuit 5 comprises a binarization circuit 5c for performing binarization by an error diffusion method, and a binarization circuit 5b for performing binarization by a fixed threshold value. These two circuits are switched based on a signal line 4a extending from the control circuit 9, which corresponds to an output signal from a halftone key depression detection circuit 6. More specifically, when the signal line 4a is at "1" level, the error diffusion circuit 5c is selected; when the signal line 4a is at "0" level, the fixed threshold value circuit 5b is selected. A signal train consisting of black and white binary signals binarized by the binarization circuit 5 is output onto the signal line 4b, and is then sent to the encoding circuit 4.

The binarization circuit will be described in more detail later.

The halftone key depression detection circuit 6 detects a depression of a halftone key of an operation unit 12 comprising a known switch input circuit, and the like. An operator of a facsimile apparatus depresses the halftone key when an original to be transmitted is a photograph original or a photograph-character mixed original. Upon detection of the depression of the halftone key, "1" is output onto a signal line 6a. When an original is a character original and the operator does not depress the halftone key, "0" is output onto the signal line 6a.

The demodulator 7 receives reception data which is sent through the hybrid circuit 2 from the signal line 2b, and demodulates a received modulated signal by a method defined by the CCITT recommendation V27ter or V29 The data demodulated by the demodulator 7 is output to a decoder 8 through a signal line 7a. The decoder 8 receives a signal on the signal line 7a, and performs MH or MR decoding corresponding to an encoding method of a calling party based on the CCITT recommendation T4. The received data decoded by the decoder 8 is output to the control circuit 9 via a signal line 8b.

The control circuit 9 comprises a microcomputer, a control memory 9a, and the like, and controls operations of the overall apparatus of this embodiment in accordance with a predetermined program stored in the memory 9a. Furthermore, the control circuit 9 converts and edits data from the decoder 8 into a recording data format in a recording unit 11, and outputs the processed data to the recording unit 11 through a signal line 11a.

When an original is transmitted, the control circuit 9 checks an output signal from the halftone key depression detection circuit 6, and also checks a type of original to select a processing method in the binarization circuit 5 and an encoding method in the encoding circuit 4.

As the output signal 6a from the halftone key depression detection circuit 6, "1" is output when the halftone key is depressed; otherwise, "0" is output.

The control circuit 9 specifies an object to be selected on the basis of the output signal 6a. More specifically, when the signal line 6a is at "1" level, the control circuit 9 outputs "1" onto the signal line 4c to select the MH encoding method of the encoding circuit 4, thereby selecting the MH circuit 4d.

When the signal line 6a is at "0" level, the control circuit 9 checks the encoding method of the facsimile apparatus of a called party, and selects one of the MR encoding circuit 4e (outputs "0" onto the signal line 4c) and the MH encoding circuit 4d (outputs "1" onto the signal line 4c) in accordance with a decoding means of a destination communication apparatus on the basis of almost the same standards as conventional ones.

When the signal line 6a is at "1" level, the control circuit 9 outputs "1" onto the signal line 4a to select the error diffusion circuit 5c of the binarization circuit 5; when the signal line 6a is at "0" level, it outputs "0" onto the signal line 4a to select the fixed threshold value circuit 5b of the binarization circuit 5.

A reading unit 10 comprises an optical system including a photoelectric transducer such as a CCD for reading an original, a driver for scanning the optical system with respect to an original, and the like, and read-scans an original. An output signal from the reading unit 10 is output to the control circuit 9 through a signal line 10a, and is also output to the binarization circuit 5 through a signal line 5a.

The recording unit 11 comprises a thermal printer, an ink-jet printer, or the like for receiving data from the signal line 8b, and performing recording.

The operation unit 12 comprises a known switch input circuit, and the like, and inputs operation instructions of the apparatus of this embodiment. The operation unit 12 comprises various instruction keys including the above-mentioned halftone key, a simple display unit for displaying, e.g., an operation guide, and the like.

FIG. 2 shows a part of a protocol (facsimile communication sequence) in a CCITT recommendation G3 standard facsimile apparatus, which protocol is also used in the apparatus of this embodiment with the above arrangement.

As shown in FIG. 2, a facsimile apparatus of a called party which receives an incoming call informs its own encoding possible encoding method to a facsimile apparatus of a calling party by an NFS signal 201 and a DIS signal 202 which indicate standard functions.

The calling party receives the sent DIS signal 202, and transmits an NSS signal 203 and a DCS signal 204 to the called party. At this time, an encoding method to be used is simultaneously informed to the called party by the DCS signal 204. Synchronization between the two apparatuses is established using training frames 205 and 206, and preprocedure processing is terminated in response to a CFR signal 207 from the called party. Thereafter, data transmission is started using data transmission frames 208 to 210.

Figure 3:
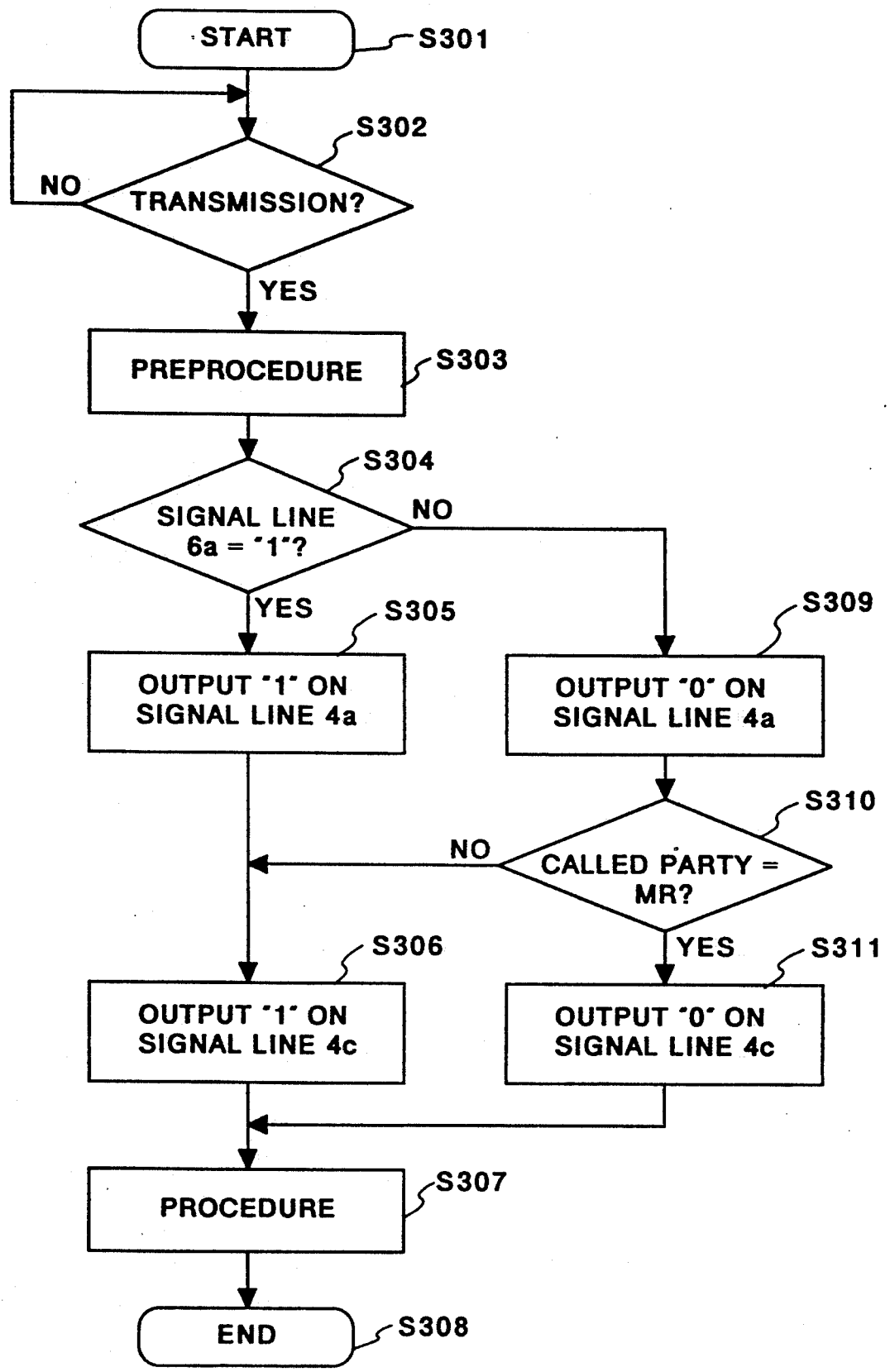
FIG. 3 is a communication control flow chart of this embodiment.

Operation control of this embodiment with the above arrangement will be described below with reference to the flow chart shown in FIG. 3.

Note that the following control is performed by the control circuit 9.

Prior to transmission, an operator sets an original on the reading unit 10, and depresses, e.g., the halftone key of the operation unit 12 as needed according to the type of original.

A transmission operation is then started, and the flow advances from step S302 to step S303 to execute a preprocedure (S201 and S202 in FIG. 2) so as to detect the standard functions of the called party. In step S304, it is checked if a "1"-level signal is generated on the signal line 6a, i.e., whether or not the operator selects a halftone mode.

If the "1"-level signal is output onto the signal line 6a, i.e., the operator selects the halftone mode, the flow advances to step S305. In step S305, a "1"-level signal is output onto the signal line 4a to select the error diffusion circuit 5c, thereby selecting binarization processing by an error diffusion method as pseudo halftone image processing. In step S306, a "1"-level signal is output onto the signal line 4c to select the MH circuit 4d of the encoding circuit 4, thereby selecting encoding processing by the MH encoding method.

The flow then advances to step S307, and a procedure in steps S203 to S210 in FIG. 2 is executed, so that the reading unit 10 is controlled to scan an original so as to read image data to be transmitted. Then, the read data is binarized by the selected binarization processing of the binarization circuit 5. The binary data is encoded by the selected encoding method of the encoding circuit 4. The flow then advances to step S308, and the encoded data is modulated by the modulator 3. The modulated data is transmitted to the called party through the hybrid circuit 2 and the NCU 1, thus ending this communication.

On the other hand, if it is determined in step S304 that a "1"-level signal is not generated on the signal line 6a, i.e., if the operator does not select the halftone mode, the flow advances to step S309. In step S309, a "0"-level signal is output onto the signal line 4a to select the fixed threshold value circuit 5b of the binarization circuit 5. In step S310, it is checked based on a DIS signal from the called party indicated by 202 in FIG. 2 if the called party has the MR encoding function.

If it is determined that the called party has the MR encoding function, the flow advances to step S311, and a "0"-level signal is output onto the signal line 4c, thereby selecting the MR encoding circuit 4e. The flow then advances to step S307.

If it is determined in step S310 that the called party does not have the MR encoding function and has only the MH encoding function, the flow advances to step S306.

With the above-mentioned control, binarization and encoding processing can be performed with the most efficient methods according to the type of original, and efficient facsimile communications can be performed.

Figure 4:
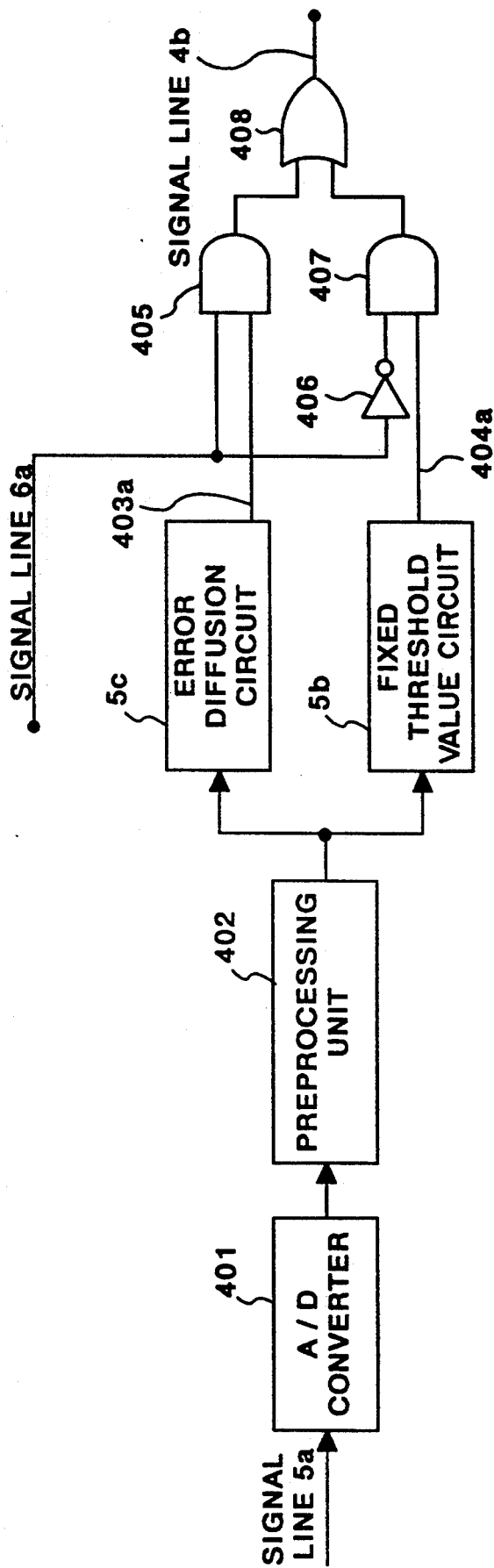
FIG. 4 is a block diagram showing a detailed arrangement of a binarization processing circuit of the embodiment shown in FIG. 1.

FIG. 4 shows a detailed arrangement of the binarization circuit 5 shown in FIG. 1.

An output signal from the reading unit 10 through the signal line 5a, i.e., the control circuit 9 is an analog signal, and is converted into a digital signal by an A/D converter 401 to perform quantization. An output signal from the A/D converter 401 is input to a preprocessing unit 402. The preprocessing unit 402 performs correction processing such as correction of light distribution characteristics of a fluorescent tube (not shown) as a light emission source of the reading unit, i.e., correction of shading distortion, and the like. An output signal from the preprocessing unit 402 is sent to the fixed threshold value circuit 5b and the error diffusion circuit 5c. The fixed threshold value circuit 5b performs binarization processing by the fixed threshold value processing method. The error diffusion circuit 5c performs binarization processing by the error diffusion processing method.

The error diffusion circuit 5c of this embodiment has a circuit based on an algorithm published in, R. W. Floyd and L. Steinberg, "An Adaptive Algorithm for Spatial G RAY Scale", SiD75 Digest (1976). However, the binarization processing method is not limited to the above-mentioned method, and may employ any other image processing methods as long as an error between input image data and output image data obtained when the input image data is quantized is diffused to image data of surrounding pixels to perform quantization.

Of course, a binarization method by the dither method may be employed.

More specifically, the binarization processing in the error diffusion circuit 5c is not limited to the above embodiment, but may be any other binary pseudo halftone image processing methods as long as a halftone original is quantized by black and white signals to express pseudo halftone levels.

The fixed threshold value circuit 5b quantizes an output signal from the preprocessing unit 402 into two, i.e., black and white values with a predetermined fixed threshold value.

An output signal 403a of the error diffusion circuit 5c is connected to one input terminal of an AND gate 405. When a signal level of the signal line 6a is "1", the AND gate 405 is satisfied, and the signal 403a from the error diffusion circuit 5c is output onto the signal line 4b of an OR gate 408, thereby selecting the error diffusion circuit 5c.

An output signal 404a of the fixed threshold value circuit 5b is input to one input terminal of an AND gate 407. When a signal level of the signal line 6a is "0", the AND gate 407 is satisfied, and the signal 404a from the fixed threshold value circuit 5b is output onto the signal line 4b of the OR gate 408, thereby selecting the fixed threshold value circuit 5b.

A photograph portion of the NO. 1 test chart [16] of the Society of Image Electronics was extracted, and compression ratios in units of compression methods were obtained.

Binarization processing methods used were three methods, i.e., an error diffusion method, a spiral dither method, and a Bayer dither method (4×4 matrix).

Compression methods used were two methods, i.e., MH and MR methods.

Calculation examples of compression ratios in units of compression methods are summarized in Table 2.

In Table 2,

Compression ratio (bit/pel) = $\dfrac{\text{Total Code Length After Encoding}}{\text{Total Code Length of Present Image}}$ As can be seen from Table 2, according to this embodiment, an optimal binarization method and encoding method according to a type of original to be actually transmitted can be selected, and communication efficiency can be greatly improved.

A facsimile apparatus has been exemplified in the description of the embodiment. However, the present invention is not limited to this, but may be applicable to various other cases wherein, for example, a reading unit such as a scanner is connected to an electronic editor apparatus or a wordprocessor, an image is read and encoded, and the obtained data is stored.

In the above description, the type of original is discriminated upon depression of a key by an operator. Whether or not a read image is a halftone image may be automatically discriminated on the basis of actual read data to select an optimal binarization method and encoding method.

As described above, according to the present invention, an image binarized by a pseudo halftone binarization processing method is forcibly encoded by the MH encoding method, so that a compression ratio higher than that attained by the MR encoding method can be realized, thus saving a communication time and a communication charge.

As many apparently widely different embodiments of the present invention can be made without departing from the spirit and scope thereof, it is to be understood that the invention is not limited to the specific embodiments thereof except as defined in the appended claims.

TABLE 1

| Calling Party | Called Party | Encoding/Decoding Method |
|---|---|---|
| MR.MH | MR.MH | MR |
| MR.MH | MH | MH |
| MH | MR.MH | MH |
| MH | MH | MH |

TABLE 2

|  | MH Method | MR Method |
|---|---|---|
| Error Diffusion Method | 1.689 | 1.763 |
| Spiral Dither Method | 0.871 | 0.958 |
| Bayer Dither Method | 1.986 | 2.318 |

What is claimed is:

1. A data communication apparatus comprising:
   first image processing means for binarizing an original by a pseudo halftone processing method;
   second image processing means for binarizing an original with a fixed threshold value;
   selection means for selecting one of said first and second image processing means;
   encoding means for encoding a binary image by one of MH encoding and MR encoding; and
   detection means for detecting which image processing means is selected by said selection means,
   wherein when said detection means determines that said first image processing means is selected, said encoding means performs encoding by the MH encoding method to perform a data communication with a destination apparatus.

2. The apparatus according to claim 1, wherein when said detection means determines that said second image processing means is selected, said encoding means checks an encoding method of the destination apparatus, and performs encoding of a binary image according to the MH or MR encoding method on the basis of the encoding method of the destination apparatus to perform data communication with the destination apparatus.

3. The apparatus according to claim 2, wherein said data communication apparatus comprises a CCITT recommendation G3 standard facsimile apparatus, and said encoding means checks the encoding method of the destination apparatus on the basis of NFS and DIS signals indicating standard functions from the communication destination apparatus.

4. The apparatus according to claim 3, further comprising:
   information means for informing an encoding method of said encoding means thereof by a DCS signal as a reception instruction to the destination apparatus.

5. The apparatus according to claim 1, wherein when an original is halftone data, said selection means selects said first image processing means.

6. The apparatus according to claim 1, wherein when an original is not halftone data, said selection means selects said second image processing means.

7. A data communication method for a data communication apparatus comprising first image processing means for binarizing an original by a pseudo halftone processing method, second image processing means for binarizing an original with a fixed threshold value, selection means for selecting one of said first and second image processing means, encoding means for encoding a binary image by one of MH encoding and MR encoding, and detection means for detecting which image processing means is selected by said selection means,
   comprising the step of performing encoding by the MH encoding method to transmit encoded data to a destination apparatus when said detection means detects that said first image processing means is selected.

8. The method according to claim 7, further comprising the steps of:
   checking an encoding method of the destination apparatus when said detection means determines that said second image processing means is selected; and
   encoding a binary image by the MH or MR encoding method on the basis of the encoding method of the destination apparatus to transmit the encoded data to the destination apparatus.

9. The method according to claim 8, wherein said data communication apparatus comprises a CCITT recommendation G3 standard facsimile apparatus, and said encoding means checks the encoding method of the destination apparatus on the basis of NFS and DIS signals indicating standard functions from the communication destination apparatus to determine an encoding method thereof, and informs the encoding method thereof by a DCS signal as a reception instruction to the destination apparatus.

10. The method according to claim 7, wherein
when an original is halftone data, said selection means selects said first image processing means.

11. The method according to claim 7, wherein
when an original is not halftone data, said selection means selects said second image processing means.

12. A data communication apparatus comprising:
first image processing means for binarizing an original by a pseudo halftone processing method;
second image processing means for binarizing an original with a fixed threshold value;
selection means for selecting one of said first and second image processing means;
encoding means for encoding a binary image by one of a one-dimensional encoding method and a two-dimensional encoding method; and
detection means for detecting which image processing means is selected by said selection means,
wherein when said detection means determines that said first image processing means is selected, said encoding means performs encoding by the one-dimensional encoding method to perform a data communication with a destination apparatus.

13. The apparatus according to claim 12, wherein when said detection means determines that said second image processing means is selected, said encoding means checks an encoding method of the destination apparatus, and performs encoding of a binary image according to the one-dimensional or two-dimensional encoding method in accordance with the encoding method of the destination apparatus to perform data communication with the destination apparatus.

14. The apparatus according to claim 13, wherein
said data communication apparatus comprises a CCITT recommendation G3 standard facsimile apparatus, and said encoding means checks the encoding method of the destination apparatus on the basis of NFS and DIS signals indicating standard functions from the communication destination apparatus.

15. The apparatus according to claim 14, further comprising:
information means for identifying an encoding method of said encoding means by a DCS signal as a reception instruction to the destination apparatus.

16. The apparatus according to claim 12, wherein
when an original is halftone data, said selection means selects said first image processing means.

17. The apparatus according to claim 12, wherein
when an original is other than halftone data, said selection means selects said second image processing means.

18. A data communication method for a data communication apparatus comprising first image processing means for binarizing an original by a pseudo halftone processing method, second image processing means for binarizing an original with a fixed threshold value, selection means for selecting one of said first and second image processing means, encoding means for encoding a binary image by one of one-dimensional encoding and two-dimensional encoding, and detection means for detecting which image processing means is selected by said selection means, said method comprising the steps of performing encoding by the one-dimensional encoding method when said detection means detects that first image processing means is selected and transmitting the encoded data to a destination apparatus.

19. The method according to claim 18, further comprising the steps of:
checking an encoding method of the destination apparatus when said detection means determines that said second image processing means is selected; and
encoding a binary image by the one-dimensional or two-dimensional encoding method on the basis of the encoding method of the destination apparatus to transmit the encoded data to the destination apparatus.

20. The method according to claim 19, wherein
said data communication apparatus comprises a CCITT recommendation G3 standard facsimile apparatus, and said encoding means checks the encoding method of the destination apparatus on the basis of NFS and DIS signals indicating standard functions from the communication destination apparatus to determine an encoding method thereof, and informs the encoding method thereof by a DCS signal as a reception instruction to the destination apparatus.

21. The method according to claim 18, wherein
when an original is halftone data, said selection means selects said first image processing means.

22. The method according to claim 18, wherein
when an original is not halftone data, said selection means selects said second image processing means.

* * * * *